(12) United States Patent
Kirkwood et al.

(10) Patent No.: US 7,880,134 B2
(45) Date of Patent: Feb. 1, 2011

(54) AZIMUTHAL ELEMENTAL IMAGING

(75) Inventors: Andrew D. Kirkwood, Houston, TX (US); Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 113 days.

(21) Appl. No.: 11/936,203

(22) Filed: Nov. 7, 2007

(65) Prior Publication Data

US 2009/0114807 A1 May 7, 2009

(51) Int. Cl.
*G01V 5/10* (2006.01)
(52) U.S. Cl. .................................. 250/269.6
(58) Field of Classification Search ............. 250/269.6, 250/269.7, 269.8, 253, 254, 256, 261, 262, 250/264, 265, 266, 269
See application file for complete search history.

(56) References Cited

U.S. PATENT DOCUMENTS

| | | | | |
|---|---|---|---|---|
| 5,343,041 A * | 8/1994 | Ruscev et al. | ............. | 250/269.6 |
| 5,502,686 A | 3/1996 | Dory et al. | ..................... | 367/34 |
| 5,539,225 A | 7/1996 | Loomis et al. | | |
| 6,215,120 B1 | 4/2001 | Gadeken et al. | ............. | 250/256 |
| 6,584,837 B2 | 7/2003 | Kurkoski | ................. | 73/152.02 |
| 6,944,548 B2 | 9/2005 | Radtke et al. | ................... | 702/8 |
| 6,957,708 B2 | 10/2005 | Chemali et al. | | |
| 7,000,700 B2 | 2/2006 | Cairns et al. | ............. | 166/255.2 |
| 7,117,092 B2 | 10/2006 | Jacobson | | |
| 7,205,535 B2 | 4/2007 | Madigan et al. | .......... | 250/269.6 |
| 7,256,582 B2 | 8/2007 | Gorek et al. | ................. | 324/373 |
| 2004/0128073 A1 * | 7/2004 | Radtke et al. | ................... | 702/8 |
| 2005/0028586 A1 * | 2/2005 | Smits et al. | ............... | 73/152.14 |
| 2005/0199794 A1 | 9/2005 | Mickael | | |
| 2006/0033023 A1 * | 2/2006 | Pemper et al. | ............ | 250/269.6 |
| 2006/0124354 A1 * | 6/2006 | Witte | ........................... | 175/40 |

* cited by examiner

*Primary Examiner*—David P Porta
*Assistant Examiner*—David S Baker
(74) *Attorney, Agent, or Firm*—Mossman Kumar & Tyler PC

(57) ABSTRACT

Measurements made by a pulsed neutron tool with two or more gamma ray detectors are used to provide a mineralogical and/or elemental image of the formation. This may be used in reservoir navigation and in furthering the understanding of the geology of the prospect. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(*b*).

25 Claims, 4 Drawing Sheets

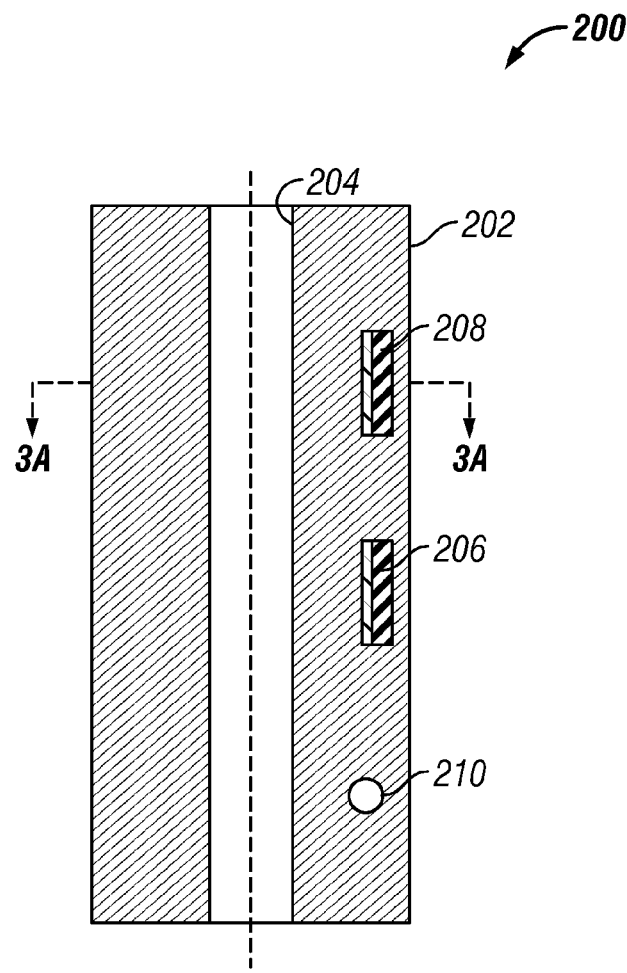
FIG. 2
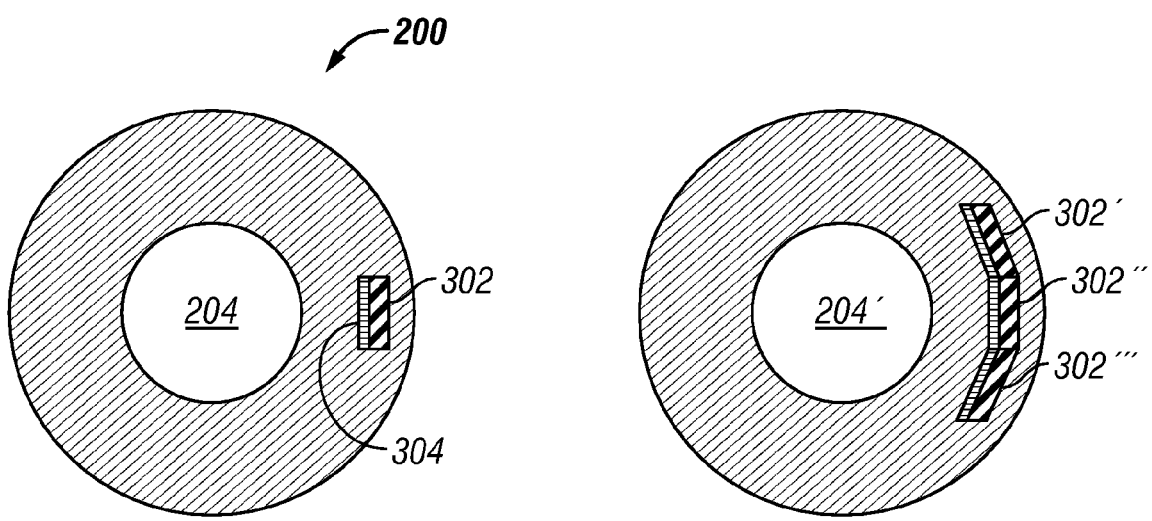
FIG. 3A  FIG. 3B

AZIMUTHAL ELEMENTAL IMAGING

FIELD OF THE DISCLOSURE

The present disclosure relates generally to devices, systems, and methods of geological exploration in wellbores. More particularly, the present disclosure describes a device, a system, and a method useful for producing a lithology image of an earth formation in a borehole during drilling.

BACKGROUND OF THE DISCLOSURE

A variety of techniques are currently utilized in determining the presence and estimation of quantities of hydrocarbons (oil and gas) in earth formations. These methods are designed to determine formation parameters, including, among other things, the resistivity, porosity, and permeability of the rock formation surrounding the wellbore drilled for recovering the hydrocarbons. Typically, the tools designed to provide the desired information are used to log the wellbore. Much of the logging is done after the wellbores have been drilled. More recently, wellbores have been logged while drilling, which is referred to as measurement-while-drilling (MWD) or logging-while-drilling (LWD). One advantage of MWD techniques is that the information about the rock formation is available at an earlier time when the formation is not yet damaged by an invasion of the drilling mud. Thus, MWD logging may often deliver better formation evaluation (FE) data quality. In addition, having the formation evaluation (FE) data available already during drilling may enable the use of the FE data to influence decisions related to the ongoing drilling (such as geo-steering, for example). Yet another advantage is the time saving and, hence, cost saving if a separate wireline logging run can be avoided.

An important aspect of exploration is that of correlating geological formations across a reservoir. The dictionary definition of term "lithology", which we adopt, is:

the character of a rock formation or of the rock found in a geological area or stratum expressed in terms of its structure, mineral composition, color, and texture.

Methods have been developed for producing images of the borehole wall using electrical, acoustic, gamma ray and density measurements using sensors conveyed into the borehole on a bottomhole assembly. See, for example, U.S. Pat. No. 6,584,837 to Kurkoski; U.S. Pat. No. 7,256,582 to Gorek et al., U.S. Pat. No. 5,502,686 to Dory et al., all having the same assignee as the present disclosure. See also U.S. Pat. No. 6,215,120 to Gadeken et al., and U.S. Pat. No. 6,944,548 to Radtke et al.

A drawback of these imaging methods is that while they reveal structural information about the earth formation, they provide little or no information about the formation mineral composition. The present disclosure addresses this deficiency and enables a more complete lithologic characterization of earth formations using MWD techniques.

SUMMARY OF THE PRESENT DISCLOSURE

One embodiment of the disclosure is an apparatus for determining a mineral composition of an earth formation. The apparatus includes a logging tool configured to be conveyed in a borehole. The apparatus also includes at least one processor configured to bin, into a plurality of azimuthal sectors, measurements made by the logging tool during continued rotation thereof, process the binned measurements to estimate an elemental composition of the earth formation for each of the plurality of azimuthal sectors, and use a set of possible mineral constituents for the earth formation to determine a fraction of each of the possible mineral constituents that would give the estimated elemental composition for each of the plurality of azimuthal sectors. The at least one processor may be further configured to determine the fraction of each of the possible mineral constituents without using an estimate of a shale volume. The logging tool further may further include a pulsed neutron source configured to propagate neutrons into the earth formation, and the measurements are made by at least one detector spaced apart from the source of neutrons configured to measure gamma rays resulting from interaction of the neutrons with nuclei in the earth formation. The at least one processor may be configured to determine the elemental composition by further determining (i) a capture spectrum of gamma rays, and (ii) an inelastic spectrum of gamma rays. The at least one processor is configured to determine the fraction of each of the possible constituents by solving a constrained optimization problem. The measurements may include gamma ray spectra and the processor may be configured to estimate the elemental composition by decomposing the gamma ray spectra using known basis functions for a set of elements. The at least one processor may be further configured to produce an image of at least one of the possible mineral constituents. The set of possible mineral constituents may included dolomite, limestone, kaolinite, shale, smectite, siderite, anhydrite, magnetite, quartz, biotite, albite, anorthite, orthoclase, microcline, montmorillonite, chlorite, illite, muscovite, and/or glauconite. The at least one processor may be further configured to use the determined fraction of at least one of the possible constituents as an indication of diagenesis, source-rock maturation, approach to a potential reservoir, and/or approach to a shale lens. The at least one processor may be further configured to estimate a photoelectric factor for each of the plurality of azimuthal sectors. The logging tool may be configured to be conveyed into the borehole on a logging string on a wireline, and/or a bottomhole assembly on a drilling tubular. The at least one detector may further include an auxiliary detector configured to be responsive primarily to gamma rays resulting from interaction of the neutrons with a fluid in the borehole, and the at least one processor may be further configured to use measurements made by the auxiliary detector in the determination of the fraction of each of mineral constituents.

Another embodiment is a method of determining a mineral composition of an earth formation. The method includes conveying a logging tool into a borehole in the earth formation, binning measurements made by the logging tool during continued rotation thereof into a plurality of azimuthal sectors, processing the binned measurements to estimate an elemental composition of the earth formation for each of the plurality of azimuthal sectors, and determining a fraction of each of a set of predefined mineral constituents that would give said estimated elemental composition for each of the plurality of azimuthal sectors. The determination of the fraction of each of the predefined mineral constituents may be done without using an estimate of a shale volume. The measurements may include gamma rays resulting from irradiation of the formation by a pulsed neutron source on the logging tool. Determining the elemental composition may be done by further using a capture spectrum of gamma rays and an inelastic spectrum of gamma rays. Determining the fraction of each of the possible constituents may be done by solving a constrained optimization problem. Estimation of the elemental composition may be done by decomposing the gamma ray spectra using known basis functions for a set of elements. An image of at least one of the possible mineral constituents may be produced. The determined fraction of at least one of the possible constituents may be used as an indication of diagenesis, source-rock maturation, approach to a potential reservoir and/or approach to a shale lens. A direction of drilling may be controlled using a determined fraction of at least one of the possible mineral constituents. A photoelectric factor may be determined for each of the plurality of azimuthal sectors. Additional measurements of gamma rays resulting primarily from interaction of the neutrons with a fluid in the borehole may be may used in the determination of the fraction of each of mineral constituents.

Another embodiment is a computer readable medium for use with an apparatus for determining a mineral composition of an earth formation. The apparatus includes a logging tool configured to be conveyed in a borehole in the earth formation. The medium includes instructions that enable a processor to bin measurements made by the logging tool during continued rotation thereof into a plurality of azimuthal sectors, process the binned measurements to estimate an elemental composition of the earth formation for each of the plurality of azimuthal sectors, and use a set of possible mineral constituents for the earth formation to determine a fraction of each of the possible mineral constituents that would give said estimated elemental composition for each of the plurality of azimuthal sectors. The medium may include a ROM, an EPROM, an EEPROM, a flash memory and/or an optical disk.

BRIEF DESCRIPTION OF THE FIGURES

The present disclosure is best understood with reference to the accompanying figures in which like numerals refer to like elements and in which:

FIG. 2 is a cross section elevation view of a tool portion used in the system of FIG. 1;

FIGS. 3A and 3B are cross section top views of the tool portion of FIG. 3 to show two arrangement of the detector;

DETAILED DESCRIPTION OF ILLUSTRATIVE EMBODIMENTS

Figure 1:
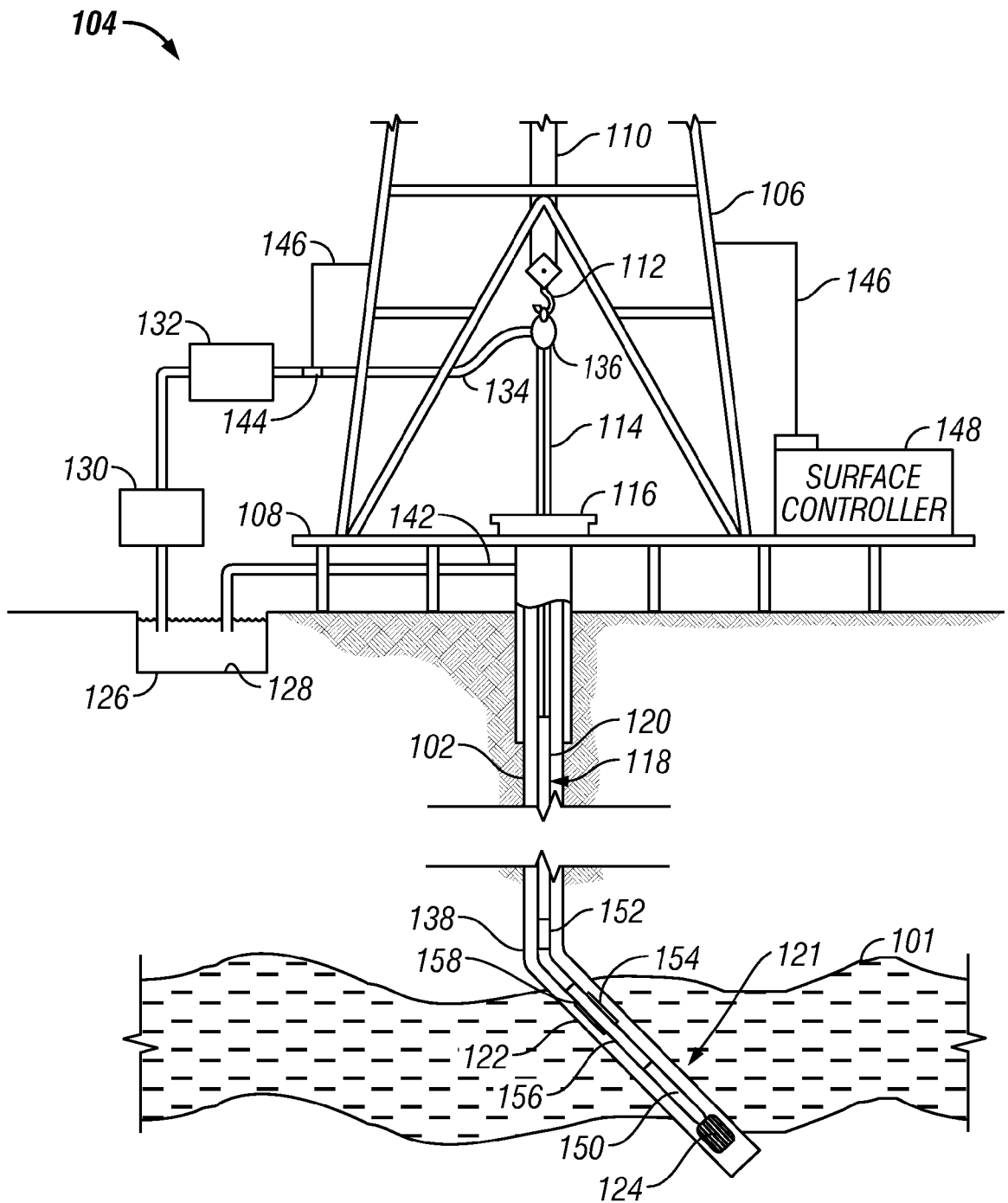
FIG. 1 schematically illustrates a drilling system suitable for use with the present disclosure.

FIG. 1 is an elevation view of a simultaneous drilling and logging system that incorporates an embodiment of the present disclosure. A borehole 102 is drilled into the earth under control of surface equipment including a rotary drilling rig 104. In accordance with a conventional arrangement, rig 104 includes a derrick 106, derrick floor 108, draw works 110, hook 112, kelly joint 114, rotary table 116, and drill string 118. The drill string 118 includes drill pipe 120 secured to the lower end of the kelly joint 114 and to the upper end of a section comprising a plurality of drill collars. The drill collars include not separately shown drill collars such as an upper drill collar, an intermediate sub drill collar, and a lower drill collar bottomhole assembly (BHA) 121 immediately below the intermediate sub. The lower end of the BHA 121 carries a downhole tool 122 of the present disclosure and a drill bit 124.

Drilling fluid 126 is circulated from a mud pit 128 through a mud pump 130, past a desurger 132, through a mud supply line 134, and into a swivel 136. The drilling fluid 126 flows down through the kelly joint 114 and a longitudinal central bore in the drill string, and through jets (not shown) in the lower face of the drill bit. Return fluid 138 containing drilling mud, cuttings and formation fluid flows back up through the annular space between the outer surface of the drill string and the inner surface of the borehole to be circulated to the surface where it is returned to the mud pit through a mud return line 142. A shaker screen (not shown) separates formation cuttings from the drilling mud before the mud is returned to the mud pit.

The system in FIG. 1 may use any conventional telemetry methods and devices for communication between the surface and downhole components. In the embodiment shown mud pulse telemetry techniques are used to communicate data from down hole to the surface during drilling operations. To receive data at the surface, there is a transducer 144 in mud supply line 132. This transducer generates electrical signals in response to drilling mud pressure variations, and a surface conductor 146 transmits the electrical signals to a surface controller 148.

If applicable, the drill string 118 can have a downhole drill motor 150 for rotating the drill bit 124. Incorporated in the drill string 118 above the drill bit 124 is the downhole tool 122 of the present disclosure. A telemetry system 152 is located in a suitable location on the drill string 118 such as above the tool 122. The telemetry system 152 is used to receive commands from, and send data to, the surface via the mud-pulse telemetry described above.

The surface controller 148 may contain a computer, memory for storing data, data recorder and other peripherals. The surface controller 148 also responds to user commands entered through a suitable device, such as a keyboard.

In one embodiment of the system of present disclosure, the BHA 121 contains various sensors and LWD devices to provide information about the formation, downhole drilling parameters and the mud motor. The downhole assembly 121 may be modular in construction, in that the various devices are interconnected sections so that the individual sections may be replaced when desired.

Still referring to FIG. 1, the BHA 121 also may contain sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string.

The BHA 121 of the present disclosure includes a tool 122, which contains a nuclear device for providing information useful for evaluating and testing subsurface formations along the borehole 122. The nuclear device includes a pulsed neutron source and two detectors for measuring resulting gamma rays. In use, high energy neutrons are emitted into the surrounding formation. This is discussed further below.

FIG. 2 illustrates an embodiment of the present disclosure for logging while drilling (LWD). Shown in cross section is a tool portion 200. The tool portion 200 is, for example, a drill collar or a bottom-hole assembly (BHA) 121 described above and shown in FIG. 1. The tool portion 200 may include a cylindrical body 202 having a central bore 204 for allowing drilling fluid to flow through the tool. A pulsed neutron source 210 is disposed in the tool body 202, and one or more detectors 206 and 208 are disposed in the tool body 202 for detecting gamma rays resulting from scattering by nuclei in the earth formation of neutrons from the neutron source 210.

Shown is a dual-detector arrangement. A first (SS) detector (short-spaced detector) 206 is disposed in the tool body 202 axially displaced from the neutron source 210. A second detector (LS or far detector) 208 is disposed in the wall axially displaced from the first detector 206 and from the neutron source 210. Several alternative embodiments of the present disclosure can be described with reference to FIGS. 1 and 2. The tool portion 200 might include a non-rotating sleeve 156 to house the detectors 206 and 208. The tool portion can likewise include one or more extendable elements 154 such as extendable probes or extendable steering blades for housing the detectors 206 and 208 and to enable moving the detectors toward the borehole wall. The detectors might also be in a fixed stabilizer 158.

FIG. 3A is a top view in cross section to show one embodiment of the detector. The detector 208 is shown with a substantially planar detection surface 302 oriented outwardly with respect to the tool center and a substrate 304 oriented inwardly toward the central bore 204. FIG. 3B shows an embodiment of the present disclosure having multiple planar detection surfaces 302', 302", and 302'''. The detection surfaces are arranged to provide multiple planes angularly displaced to provide more capture surface area.

In an exemplary embodiment, the LS and SS detectors 202 and 208 are comprised of bismuth-germanate (BGO) crystals coupled to photomultiplier tubes. In another embodiment of the disclosure, Brilliance 380™ crystals of $LaBr_3:Ce$ provided by Saint-Gobain Crystals is used. To protect the detector systems from the high temperatures encountered in boreholes, the detector system may be mounted in a Dewar-type flask. Also, in an exemplary embodiment, the source comprises a pulsed neutron source using a D-T reaction wherein deuterium ions are accelerated into a tritium target, thereby generating neutrons having an energy of approximately 14 MeV.

An important feature of the present disclosure is the use of collimated sources and detectors. The collimation may be achieved by the eccentric positioning of the source and detectors, use of shielding, or combination of these approaches. In one embodiment, a Boron-coated Tungsten shield is used. Using these or other approaches known in the art, the azimuthal sensitivity of the tool may be increased.

Figure 4:
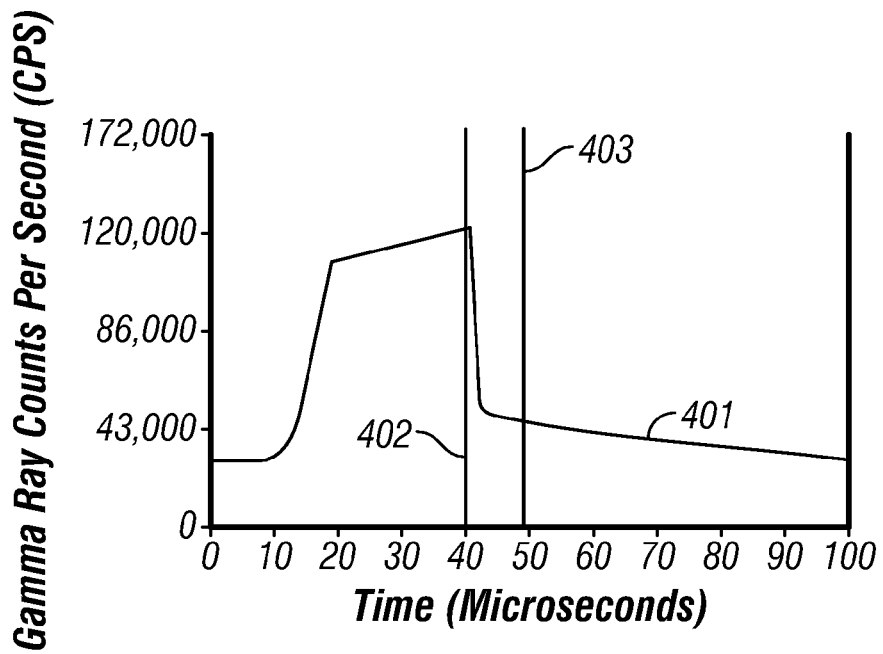
FIG. 4 (prior art) shows the basic timing of the pulsed neutron source and the produced gamma rays.

FIG. 4 illustrates the basic timing of the pulsed neutron source and the produced gamma rays. Time is displayed along the x-axis in microseconds. The gamma ray counts per second (cps) is displayed along the y-axis. The neutron burst defines a first-detector-gate interval, referred to as the "burst gate" or inelastic gate. Typically a total spectrum of gamma rays resulting from both inelastic neutron scattering and capture gamma ray scattering are produced during the active duration of the neutron source, and the timing of the inelastic gate enables obtaining the total spectrum. In the example of FIG. 4, the number of counts rises significantly (typically to 120 kcps) during the inelastic gate, which extends approximately from 10 μsec to 40 μsec. The deactivation of the neutron source causes the inelastic gamma rays to disappear from the count almost immediately. A "background gate" 402-403 is shown at a point substantially coincident with deactivation of the neutron source. The background gate of FIG. 4 extends approximately from 40 μsec to 50 μsec. The counts obtained during the background gate are attributable to background gamma rays, but also to capture gamma rays, which make up a significant portion of the spectrum during the background gate. The background gate is followed by a "capture gate" 401. The capture gate contains gamma rays substantially due to captured neutrons of the surrounding formation.

In an exemplary embodiment of the present disclosure, energized neutrons are injected from a pulsed neutron source 209 into a surrounding formation. The scintillation detector records the spectrum over a predetermined time interval. During the inelastic gate, a total spectrum of gamma rays is obtained from the formation layer. During a capture gate, a capture spectrum of gamma rays is obtained from the formation layer. A determinable factor of the capture spectrum can be subtracted from the obtained total spectrum to derive a spectrum substantially representative of an inelastic spectrum only. The elemental contribution to the inelastic spectrum and the capture spectrum can then be determined by determining a first constituent spectrum from the inelastic spectrum and a second constituent spectrum from the capture spectrum. An operator versed in the arts can then use the determined elemental contributions to determine a parameter of the surrounding formation.

Figure 5:
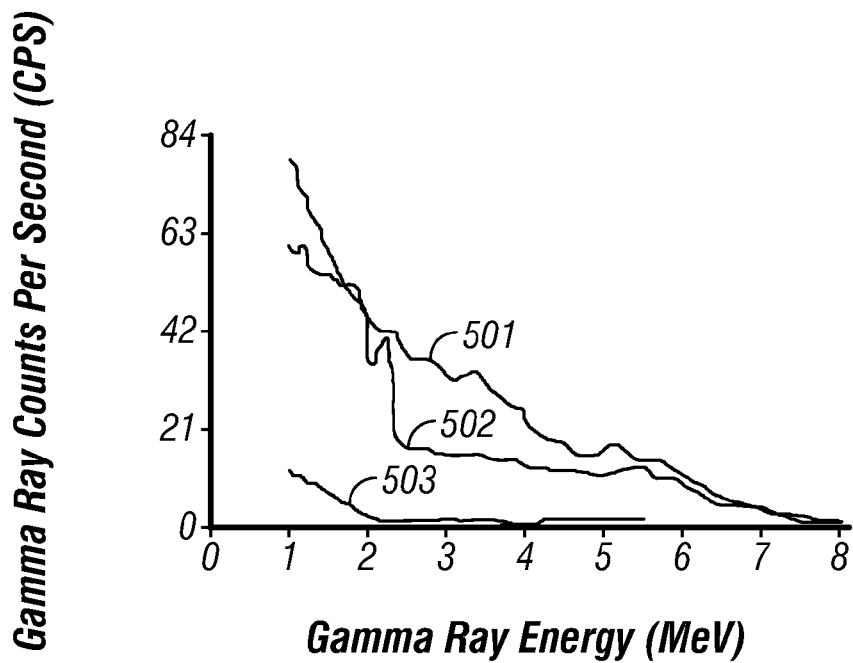
FIG. 5 (prior art) shows capture and inelastic spectra from limestone formation with oil-filled borehole.

The derived gamma ray energy spectra for data analysis comprise both the capture spectrum and the inelastic spectrum. An inelastic gamma ray is generated from the nucleus of the atom from which there is a scattering of initial highly energetic neutrons. A capture gamma ray is emitted by the nucleus of an atom through absorption of a neutron after its energy has diminished. FIG. 5 shows exemplary capture and inelastic spectra from limestone formation with oil-filled borehole. The three spectra are the inelastic spectrum 501, the capture spectra 502, and the background spectrum 503.

A feature of the present disclosure is the analysis of separate inelastic and capture spectra in terms of their constituent spectra. Prior art discusses methods for removing the effects of a capture spectrum from a total spectrum obtained during a burst gate, consequently obtaining an improved inelastic spectrum. A corrected fraction of the capture spectrum is subtracted from the total spectrum in order to generate a representative inelastic spectrum. The corrected fraction is referred to as the capture subtraction factor. The method for calculating this value comprises using a capture gamma ray response function to estimate the capture and inelastic components within a recorded time spectrum. Analysis of the spectra can be performed uphole or downhole and may be done using a processor or expert system.

As discussed in U.S. Pat. No. 7,205,535 to Madigan et al., having the same assignee as the present disclosure and the contents of which are incorporated herein by reference, a library of elemental basis functions can be used to enable a decomposition of at least one of capture and inelastic spectra into their respective constituent spectra. A partial list of elements includes Ca, Cl, Fe, Mg and Si. Currently, constituent spectra representing 20 elements are usable in the present disclosure. When the fraction of a particular element obtained from both the capture and inelastic spectrum are reasonably close, then their average value may be used for the elemental analysis. Large differences between estimates for a particular element obtained by capture and inelastic spectral decomposition should serve as a cautionary flag. As part of the spectral decomposition using basis functions, it is standard practice to also estimate uncertainties along with the regression coefficients. These uncertainties can be used to provide an estimate of the amount of an element from the individual estimates obtained from inelastic and capture spectra. The number of elements can be increased and is not meant as a limitation of the present disclosure. Elemental basis functions could further be produced using various methods. For example, use of a computer can enable generation of an elemental basis function of a previously unlisted element.

The elements that can be readily measured from the capture gamma ray energy spectrum comprise Ca, Cl, H, Fe, Mg, Si, and S. The elements that can be readily measured from the inelastic gamma ray energy spectrum comprise C, Ca, Fe, Mg, O, Si, and S. U.S. patent application Ser. No. 11/223,352 of Pemper et al., having the same assignee as the present disclosure and the contents of which are incorporated herein by reference, teaches the determination of Aluminum concentration in the earth formation. The list is not intended to be complete and other elements could also be identified. Table 1 summarizes the appearance of several elements readily identifiable in both capture and inelastic spectra. In some cases, the same element can be found in both the capture and inelastic spectra. Those elements found in both the capture and inelastic spectra further aid a log analyst in the final scientific interpretation of the data.

TABLE 1

| Element | Capture Spectrum | Inelastic Spectrum |
|---|---|---|
| Aluminum |  | Al |
| Carbon |  | C |
| Calcium | Ca | Ca |
| Chlorine | Cl |  |
| Hydrogen | H |  |
| Iron | Fe | Fe |
| Magnesium | Mg | Mg |
| Oxygen |  | O |
| Silicon | Si | Si |
| Sulfur | S | S |

Once a gamma ray spectrum is extracted for an individual element, it can be used as an elemental standard. These standards are determinable, for example, using a combination of empirical data from known formations in the Nuclear Instrument Characterization Center, and using computer simulations employing detailed physical modeling techniques. The combination of these standards that results in the best fit to the measured spectra determines the elemental yields.

Mineral identification can be derived from elemental yields. Some typical mineral compositions are listed in Table 2.

TABLE 2

| Category | Formation Type | Mineral Composition |
|---|---|---|
| General | Sandstone | $SiO_2$ |
|  | Shale | — |
| Clay | Kaolinite | $Al_2O_3$—$2SiO_2$—$2H_2O$ |
|  | Smectite | $Si_4O_{10}(OH)_2$—$nH_2O$ |
| Carbonate | Limestone | $CaCO_3$ |
|  | Dolomite | $CaMg(CO_3)_2$ |
|  | Siderite | $FeCO_3$ |
| Sulfate | Anhydrite | $CaSO_4$ |
| Oxide | Magnetite | $Fe_3O_4$ |
|  | Quartz | $SiO_2$ |
| Mica | Biotite | $K(Mg,Fe)_3(Al,Fe)Si_3O_{10}(OH,F)_2$ |

Various pattern recognition algorithms can be used to decipher the mineral concentrations measured during a logging run. Alternatively, signature recognition methods can be used to decipher elemental concentrations. An example of such patterns can be observed in Table 3. The formations measured for the example of Table 3 possess zero porosity and a 7⅞-inch borehole. An operator versed in the arts can use information from Table 3 for determination of mineral type. As an example, sandstone can be distinguished from limestone. Note, for example, that the 0 pu sandstone formation shows large fractions of silicon whereas the corresponding limestone and dolomite formations do not. As a further example, the magnesium signature in the dolomite formation enables an operator to distinguish dolomite from limestone.

TABLE 3

| Spectrum | Formation | C | Ca | Fe | H | Mg | O | Si |
|---|---|---|---|---|---|---|---|---|
| Capture | Dolomite |  | 0.62 | 0.02 | 0.24 | 0.10 |  | 0.03 |
| Capture | Limestone |  | 0.75 | 0.00 | 0.23 | 0.00 |  | 0.00 |
| Capture | Sandstone |  | 0.01 | 0.01 | 0.35 | 0.02 |  | 0.63 |
| Inelastic | Dolomite | 0.07 | 0.18 |  |  | 0.06 | 0.43 | 0.04 |
| Inelastic | Limestone | 0.08 | 0.40 |  |  | 0.00 | 0.37 | 0.00 |
| Inelastic | Sandstone | 0.00 | 0.01 |  |  | 0.01 | 0.34 | 0.51 |

In the context of wireline logging, Madigan teaches the process of going from Table 1 (the elemental analysis) to Table 2 (the mineralogical makeup of the rock) by a Linear Programming (LP) programming approach. A set of possible mineral constituents of the formation is defined. A constrained LP approach is used to find the fraction of each of the possible mineral constituents that has the determined elemental analysis. In the context of the present disclosure, using the tool with azimuthal sensitivity discussed above, it is possible to get high resolution estimates of the formation mineralogy during drilling as a function of depth and azimuth. The BHA is provided with a suitable orientation sensor such as a magnetometer. The measurements are made with sufficient resolution in azimuth and depth. Those versed in the art and having benefit of the present disclosure would recognize that usually, the signal-to-noise ratio (SNR) using the azimuthally sensitive tool discussed above is likely to be poor. An advantage of MWD measurements is the ability to stack measurements into azimuthal bins over successive rotations of the tool and thus improve the SNR. This is discussed below with reference to FIG. 6.

As discussed in Pemper, knowing the elemental fraction of aluminum makes it possible to identify mineral constituents such as albite, anorthite, orthoclase, microcline, kaolinite, montmorillonite, chlorite, illite, muscovite, biotite, and/or glauconite. From the determined mineral constituents, an indication of diagenesis and/or source rock maturation can be obtained using known techniques.

The measurements may also be used to estimate the photoelectric factor (Pe). Pe is commonly derived from the ratio of detected gamma counts in a high-energy (hard) window and low energy (soft) window of a spectrum recorded at a detector. The Pe may be computed from either detector. However, the near detector is generally used due to its better collimation and better statistics. The resulting value is a direct function of the aggregate atomic number (Z) of the elements in the formation, and so is a sensitive indicator of mineralogy. The photoelectric factor is commonly scaled on a range between 0 and 10 b/e. Common reservoir mineral reference values are: quartz 1.81; dolomite 3.14; and calcite 5.08 b/e. As discussed in U.S. patent application Ser. No. 11/780,993 of Huiszoon, having the same assignee as the present disclosure and the contents of which are incorporated herein by reference, standoff corrections may be made in the determination of Pe by using a suitable caliper measurement.

Figure 6:
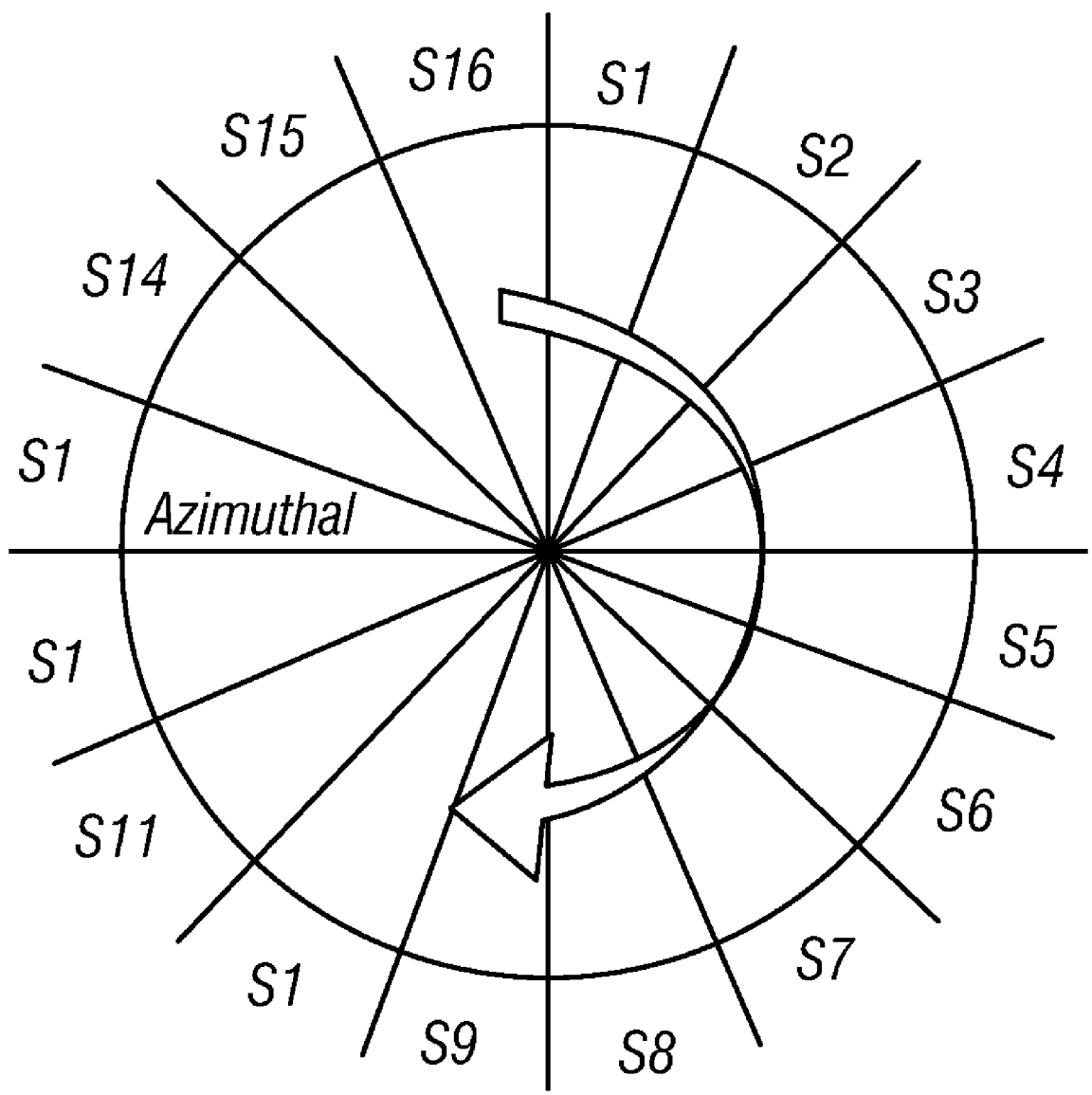
FIG. 6 shows the spatial distribution of data bins generated by the example tool of FIG. 2.

FIG. 6 illustrates how the data is spatially divided into azimuthal sectors. Details of borehole surveying methods would be known to those versed in the art and are not discussed here. The accumulation of data into azimuthal sectors is discussed, for example, in U.S. Pat. No. 7,000,700 to Cairns et al., having the same assignee as the present disclosure and the contents of which are incorporated herein by reference. In the example shown in FIG. 6, the measurements (and the estimated mineralogy and/or estimated elemental composition) are partitioned into sixteen azimuthal sectors. This is not to be construed as a limitation.

Using the method and apparatus described above, it is thus possible to produce various images of the earth formation that have significant uses. In reservoir navigation, it is desired to maintain the borehole in a desired relation to an interface such as a bed boundary or a fluid interface. Natural gamma ray measurements have been used in the past for such a purpose, relying on the radioactivity of shales. Having images of mineralogy makes it possible to identify formations with thin, interbedded sands and shales where the layer thickness cannot be resolved by natural gamma ray measurements. This may be used in reservoir navigation. An increase of silica in the image is indicative of approaching a source of sand in the geologic column and a potential reservoir with porosity. An increasing amount of clay minerals encountered during drilling may be indicative of approaching an impermeable shale lens in the earth.

As noted above, the relative amounts of different clay minerals is diagnostic of diagenesis and source rock maturation. Having such measurements along with structural information obtained from other measurements enables developing a more complete picture of the reservoir and thus increases the potential recovery of hydrocarbons.

In one embodiment of the disclosure, measurements are made with two detectors. An auxiliary detector is provided that is responsive primarily to gamma rays from the borehole fluid. This is relatively easy to do in wireline applications: the standoff is determined from caliper measurements, and FE measurements made with a large standoff that are responsive primarily to borehole fluid signals are used. For MWD applications, this is more problematic. Two approaches may be taken. In one, gamma ray measurements are made in the central bore of the drillstring: an auxiliary pulsed neutron source on the central bore may be used. This has the disadvantage that properties of drilling fluid in the annulus between the drill collar and the borehole wall would not be measured.

Alternatively, the auxiliary gamma ray detector may be collimated and/or shielded to be responsive to gamma rays arriving in a generally axial direction from the pulsed neutron source. Since the pulsed neutron source is configured for azimuthal sensitivity, an auxiliary pulsed neutron source may be used. The spectrum measured in this fashion can then be subtracted from the measurements made by the main detector to provide a borehole corrected spectral measurement (and elemental composition, mineralogical composition, etc.).

It is important to note that in the present disclosure, a wide variety of information about the earth formation is obtained from basically the same set of measurements, i.e., gamma ray measurements resulting from a pulsed neutron source. As such, the different parameters estimated by the method described above are intrinsically linked and arise from basically the same set of physical phenomena. It is to be further noted that the elemental and mineralogical composition may be obtained without knowledge of the total shale content of the formation.

The method described above may also be carried out using a logging string conveyed on a wireline provided the logging tool is provided with a motor drive for providing a 360° scan of the formation. Collectively, the BHA and the logging string may be referred to as a downhole assembly.

The processing of the data may be done by a downhole processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks. Such media may also be used to store results of the processing discussed above.

What is claimed is:

1. An apparatus configured to estimate an elemental composition of an earth formation, the apparatus comprising:
a collimated neutron source collimated in a substantially azimuthal direction;
an auxiliary pulsed neutron source collimated in a substantially axial direction;
a first radiation detector configured to be conveyed in a borehole;
a second radiation detector collimated in a substantially axial direction and configured to be responsive primarily to gamma rays resulting from interaction of neutrons from the collimated neutron source with a fluid in the borehole; and at least one processor configured to:
associate an azimuth with each of a plurality of measurements made by the first radiation detector responsive to activation of the collimated neutron source;
process the plurality of measurements and estimate an elemental composition of the earth formation for the plurality of azimuths using measurements made by the second radiation detector.

2. The apparatus of claim 1 wherein the at least one processor is configured to further estimate, for each of the plurality of azimuths, a fraction of a plurality of mineral constituents that would give the estimated elemental composition.

3. The apparatus of claim 2 wherein the at least one processor is further configured to determine the fraction of each of the mineral constituents without using an estimate of a shale volume.

4. The apparatus of claim 2 wherein the at least one processor is further configured to produce an image of at least one of the mineral constituents.

5. The apparatus of claim 2 wherein the mineral constituents are selected from the group consisting of: (i) dolomite, (ii) limestone, (iii) kaolinite, (iv) shale, (v) smectite, (vi) siderite, (vii) anhydrite, (viii) magnetite, (ix) quartz, (x) biotite, (xi) albite, (xii) anorthite, (xiii) orthoclase, (xiv) microcline, (xv) montmorillonite, (xvi) chlorite, (xvii) illite, (xviii) muscovite, and (xix) glauconite.

6. The apparatus of claim 2 wherein the at least one processor is further configured to use the estimated fraction of at least one of the mineral constituents as an indication of at least one of: (i) diagenesis, (ii) source-rock maturation, (iii) approach to a potential reservoir, (iv) approach to a shale lens.

7. The apparatus of claim 1, wherein the collimated neutron source further comprises a pulsed neutron source configured to propagate neutrons into the earth formation; and wherein the radiation detector is spaced apart from the pulsed neutron source and is configured to measure gamma rays resulting from interaction of the neutrons with nuclei in said the formation.

8. The apparatus of claim 1 wherein the at least one processor is configured to estimate the elemental composition by further determining (i) a capture spectrum of gamma rays, and, (ii) an inelastic spectrum of gamma rays.

9. The apparatus of claim 1 wherein the measurements comprise gamma ray spectra and the at least one processor is configured to estimate the elemental composition by decomposing the gamma ray spectra using known basis functions for a set of elements.

10. The apparatus of claim 1 wherein the at least one processor is further configured to estimate a photoelectric factor for the plurality of azimuths.

11. The apparatus of claim 1 wherein the radiation detector is disposed on a logging tool configured to be conveyed into the borehole on one of: (i) a logging string on a wireline, and (ii) a bottomhole assembly on a drilling tubular.

12. The apparatus of claim 1, wherein the collimated neutron source further comprises a Boron-coated tungsten shield.

13. A method of estimating an elemental composition of an earth formation, the method comprising:
conveying an azimuthally collimated detector and an azimuthally collimated neutron source into a borehole;
irradiating the earth formation using the azimuthally collimated neutron source;
associating an azimuth with each of a plurality of measurements made by the radiation detector responsive to the irradiating of the earth formation; and
estimating using the measurements and additional measurements made by an axially collimated detector responsive to gamma rays from a fluid in the borehole fluid responsive to activation of an axially collimated neutron source, an elemental composition of the earth formation for each of the plurality of azimuths.

14. The method of claim 13 further comprising estimating, for each of the plurality of azimuths, a fraction of a plurality of mineral constituents that would give the estimated elemental composition.

15. The method of claim 14 wherein the estimation of the fraction of each of the mineral constituents is done without using an estimate of a shale volume.

16. The method of claim 14 further comprising estimating the elemental composition by further using (i) a capture spectrum of gamma rays, and (ii) an inelastic spectrum of gamma rays.

17. The method of claim 14 further comprising estimating the fraction of each of the mineral constituents by solving a constrained optimization problem.

18. The method of claim 14 further comprising producing an image of at least one of the plurality of mineral constituents.

19. The method of claim 14 further comprising using the estimated fraction of at least one of the possible constituents as an indication of at least one of: (i) diagenesis, (ii) source-rock maturation, (iii) approach to a potential reservoir, (iv) approach to a shale lens.

20. The method of claim 14 further comprising controlling a direction of drilling using a determined fraction of at least one of the mineral constituents.

21. The method of claim 13 wherein the collimated neutron source further comprises a pulsed neutron source and measurements made by the radiation detector comprise gamma rays resulting from irradiation of the formation by the pulsed neutron source.

22. The method of claim 13 wherein the measurements comprise gamma ray spectra and the estimation of the elemental composition is done by decomposing the gamma ray spectra using known basis functions for a set of elements.

23. The method of claim 13 further comprising determining a photoelectric factor for each of the plurality of azimuthal sectors.

24. A non-transitory computer readable medium having stored thereon instructions that when read by at least one processor, cause the at least one processor to perform a method, the method comprising:
associating an azimuth with each of a plurality of measurements made by an azimuthally collimated detector in a borehole in an earth formation of radiation resulting from irradiation of the earth formation using an azimuthally collimated neutron source; and
estimating an elemental composition of the earth formation for each of the plurality of azimuths using the plurality of measurements and additional measurements made by an axially collimated detector responsive to gamma rays from a fluid in the borehole responsive to activation of an axially collimated neutron source.

25. The machine readable medium of claim 24 further comprising at least one of: (i) a ROM, (ii) an EPROM, (iii) an EEPROMs, (iv) a flash memory, and (v) an optical disk.

* * * * *